I. F. GOOD.
WATER-MOTOR.
No. 177,115. Patented May 9, 1876.
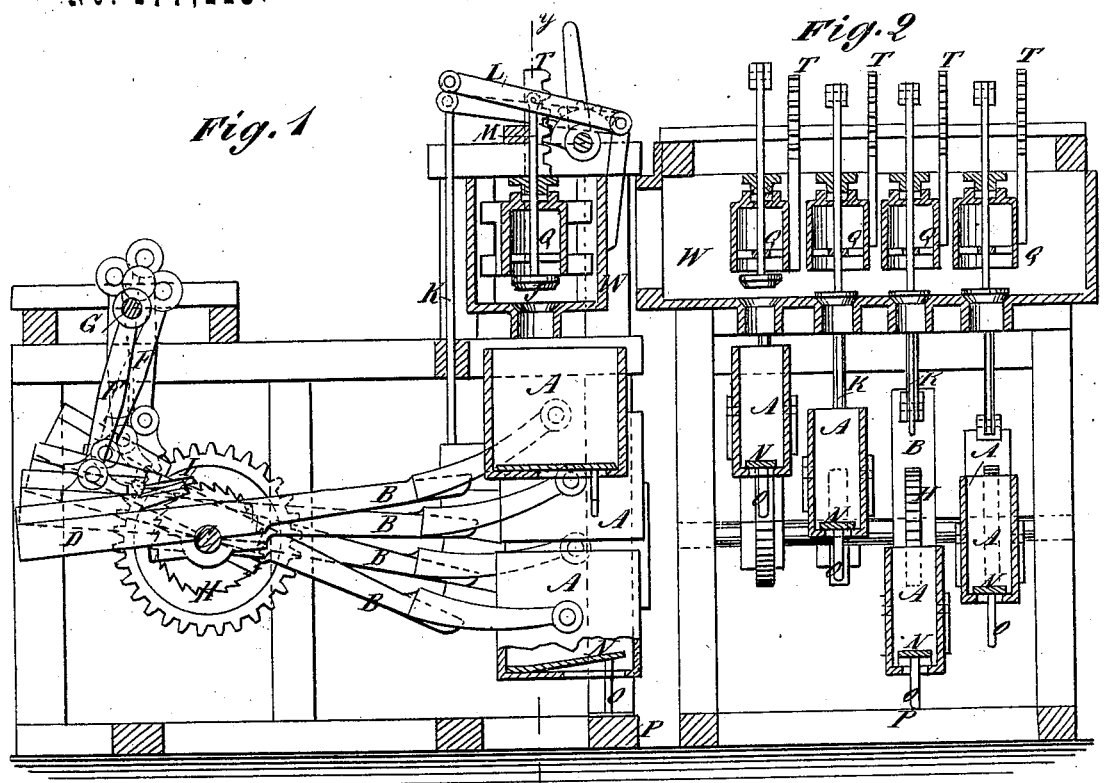
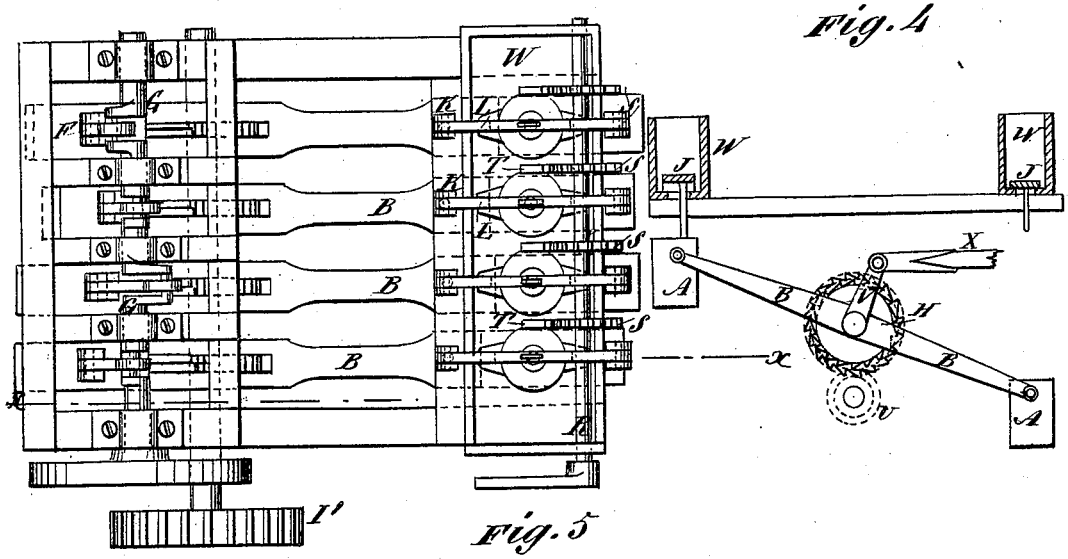
WITNESSES:
C. Neveux
John Goethals
INVENTOR:
Israel F. Good
BY
ATTORNEYS.

UNITED STATES PATENT OFFICE.

ISRAEL F. GOOD, OF GOODSVILLE, ASSIGNOR TO HIMSELF AND HIRAM F. SEIGER, OF OREFIELD, PENNSYLVANIA.

IMPROVEMENT IN WATER-MOTORS.

Specification forming part of Letters Patent No. 177,115, dated May 9, 1876; application filed April 18, 1876.

*To all whom it may concern:*

Be it known that I, ISRAEL F. GOOD, of Goodsville, county of Lehigh, and State of Pennsylvania, have invented a new and Improved Water-Motor, of which the following is a specification:

My invention consists of a series of buckets attached to a corresponding series of arms, some of which are made to rise with their buckets empty by the weight of other descending filled buckets to an elevated tank, where they are filled, and, in turn, raise the others, the excess of the weight of the filled buckets being applied to the performance of work.

Figure 1 is a longitudinal sectional elevation of my improved machine, taken on the line x x of Fig. 3. Fig. 2 is a section on line y y, Fig. 1. Fig. 3 is a plan view. Fig. 4 is a detail of a modification, and Fig. 5 is a section of a modified form of bucket.

Similar letters of reference indicate corresponding parts.

A represents the buckets, which are pivoted to the ends of the long arms of levers B, which are pivoted on the shaft C, and connected, by their short arms D and connecting-rods F, with the crank-shaft G, the cranks being set at different angles, so that some of the buckets rise while the others descend. To each lever is a ratchet-wheel, H, and a pawl, I, so arranged that when the bucket goes down loaded with water the power in excess of what is expended on the crank-shaft toward raising the other buckets will be applied to shaft C for doing work through the transmitting-wheel I'. Above the point where the buckets stop in their upward movement is a fore-bay, W, into which the water flows, having a valve, J, in the bottom to each bucket, which is opened to fill the bucket by a rod, K, lever L, and stem M, which are lifted by the lever carrying the bucket, and in each bucket is a valve, N, which is opened to let the water discharge by its stem O striking the bed-frame P. In the fore-bay are gates, Q, which shut down around the valves to cut off the water and stop the machine, said gates being worked by the shaft R, pinions S, and the rack T. The cranks of shaft G are so adjusted that whenever it stops some of the buckets will be in position for filling, so that when the gates are raised the machine will start.

The buckets may be constructed so as to tilt and empty, as represented in Fig. 5, instead of emptying by a valve, and they may be modified in respect of their connection to the arms. The levers may be extended alike on both sides of the shaft C, and have a bucket on each end to fill one when the other empties, in which case the shaft C will have two ratchets reversed as to each other for transmitting the power from the lever in both movements, one of said ratchets being geared back by suitable intermediate wheels, U, so as to unite its power with that of the other ratchet. The power may be transmitted from the shaft C by a crank-arm, V, and connecting-rod X.

Having thus described my invention, I claim as new and desire to secure by Letters Patent—

1. The combination of a series of levers, B, having a bucket at either or both ends, a shaft, C, having either one or two ratchets, H, and pawls I, to each lever, and a crank-shaft, G, having the levers connected to it substantially in the manner described.

2. The combination, with a series of buckets and levers rising and falling in succession, of a fore-bay, having valves to open and fill the buckets, and close after filling them, substantially as specified.

ISRAEL F. GOOD.

Witnesses:
 T. B. MOSHER,
 ALEX. F. ROBERTS.